(12) United States Patent
Holness et al.

(10) Patent No.: US 7,590,054 B1
(45) Date of Patent: Sep. 15, 2009

(54) PROTECTION SWITCHING IN AN ETHERNET PACKET-SWITCHED NETWORK

(75) Inventors: Marc Holness, Ottawa (CA); Dinesh Mohan, Kanata (CA); Beata Mirek, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 446 days.

(21) Appl. No.: 11/225,952

(22) Filed: Sep. 14, 2005

Related U.S. Application Data

(60) Provisional application No. 60/609,655, filed on Sep. 14, 2004.

(51) Int. Cl.
*G06F 11/00* (2006.01)
(52) U.S. Cl. .................................... 370/225; 370/244
(58) Field of Classification Search .............. 370/395, 370/400, 401, 432, 216, 217, 248, 228, 241, 370/389, 397, 225, 386, 229, 237, 352, 328, 370/392
See application file for complete search history.

(56) References Cited

U.S. PATENT DOCUMENTS

| | | | | |
|---|---|---|---|---|
| 5,768,271 | A  * | 6/1998 | Seid et al. ................... | 370/389 |
| 5,959,972 | A  * | 9/1999 | Hamami ..................... | 370/228 |
| 6,442,135 | B1 * | 8/2002 | Ofek ......................... | 370/229 |
| 6,717,944 | B1 * | 4/2004 | Bryden et al. ................ | 370/392 |
| 6,766,482 | B1   | 7/2004 | Yip et al. | |
| 6,882,626 | B1 * | 4/2005 | Marathe et al. .......... | 370/241.1 |
| 6,882,652 | B1 * | 4/2005 | Scholtens et al. ............ | 370/401 |
| 6,999,459 | B1 * | 2/2006 | Callon et al. ................ | 370/400 |
| 7,054,321 | B1 * | 5/2006 | Nanji ......................... | 370/401 |
| 7,139,276 | B1 * | 11/2006 | Sitaraman et al. ........... | 370/401 |
| 2003/0012135 | A1 | 1/2003 | Leroux et al. | |
| 2004/0165600 | A1 * | 8/2004 | Lee ........................ | 370/395.53 |
| 2005/0002339 | A1 * | 1/2005 | Patil et al. .................... | 370/237 |
| 2005/0105519 | A1 * | 5/2005 | Koppol ....................... | 370/386 |
| 2005/0180749 | A1 | 8/2005 | Koley et al. | |

OTHER PUBLICATIONS

Alcatel; "End-to-End Ethernet Connectivity Fault Management in Metro and Access Networks"; Technology White Paper; 14 pgs.

(Continued)

*Primary Examiner*—Kwang B Yao
*Assistant Examiner*—Syed Bokhari
(74) *Attorney, Agent, or Firm*—Guerin & Rodriguez, LLP; Michael A. Rodriguez

(57) ABSTRACT

Protection switching in an Ethernet packet-switched network includes establishing first and second virtual circuits. The first virtual circuit carries packet traffic associated with a different service instance from packet traffic carried by the second virtual circuit. Packet traffic of the first virtual circuit is transmitted from a source network element to a sink network element through a first Ethernet tunnel. Packet traffic of the second virtual circuit is transmitted from the same source network element to the same sink network element through a second Ethernet tunnel. The second Ethernet tunnel is a different path through the Ethernet packet-switched network from the first Ethernet tunnel. During a protection switch, the first virtual circuit is switched from the first Ethernet tunnel to the second Ethernet tunnel. After the switch, packet traffic of the first virtual circuit and packet traffic of the second virtual circuit are transmitted over the second Ethernet tunnel.

20 Claims, 13 Drawing Sheets

OTHER PUBLICATIONS

International Telecommunication Union; Series Y: Global Information Infrastructure, Internet Protocol Aspects and Next Generation Networks; "Protection Switching for MPLS Networks"; Sep. 2003; 32 pgs.

International Telecommunication Union; Series I: Integrated Services Digital Network; "ATM Protection Switching"; Feb. 1999; 59 pgs.

* cited by examiner

PROTECTION SWITCHING IN AN ETHERNET PACKET-SWITCHED NETWORK

RELATED APPLICATION

This application claims the benefit of the filing date of U.S. Provisional Application Ser. No. 60/609,655, filed Sep. 14, 2004, titled "Ethernet Virtual Circuit Protection Switching Mechanism," the entirety of which provisional application is incorporated by reference herein.

FIELD OF THE INVENTION

The invention relates generally to communication networks. More specifically, the invention relates to protection switching in Ethernet packet-switched networks.

BACKGROUND

Many service providers recognize Ethernet as the most commonly used technology for local-area networks (LANs) and, thus, desire to develop their metro and national networks to support the many emerging Ethernet applications. Examples of such Ethernet applications include Internet access, transparent LAN services, packet-based video conferencing, tunneled virtual private networks (VPNs), storage area networking (SAN), and virtual private line services. For service providers to offer service-level agreements (SLAs) for Ethernet services, quality of service (QoS) mechanisms are necessary to ensure reliable delivery of high-priority and real-time transmissions (e.g., video and voice). In general, QoS enables service providers to achieve service differentiation through predictable service performance. Such predictability comes by guaranteeing allocated (i.e., dedicated) bandwidth, improving packet loss characteristics, avoiding and managing network congestion, shaping network traffic, and setting traffic priorities across the network. For Ethernet, however, there is a general lack of tools to ensure performance of QoS guarantees and service level agreements. Consequently, Ethernet remains primarily a best-effort service.

An important tool for providing QoS in an Ethernet network is a protection scheme. One protection scheme is the spanning tree protocol. Spanning tree algorithms operate to identify a set of loop-free paths in the Ethernet network by constructing a hierarchical management structure among the various Ethernet devices in the network. Protection arises from the ability of an Ethernet device to detect fault conditions in the network and, in response, to construct another set of loop-free paths dynamically. Implementations of spanning tree algorithms can be complex, however, particularly for complex Ethernet network topologies. In addition, failure of a single path in the Ethernet network can cause a time-consuming reconfiguration of the spanning tree, on the order of tens of seconds. Time-sensitive services, such as the delivery of video and voice, cannot abide the time for reconfiguration without serious detriment to the quality of the service. Moreover, by preventing loops, spanning tree algorithms often cause portions of the Ethernet network to go unused.

SUMMARY

In one aspect, the invention features a method of protection switching in an Ethernet packet-switched network. The method comprises establishing first and second virtual circuits. The first virtual circuit carries packet traffic associated with a different service instance from packet traffic carried by the second virtual circuit. Packet traffic of the first virtual circuit is transmitted from a source network element to a sink network element through a first Ethernet tunnel and packet traffic of the second virtual circuit is transmitted from the same source network element to the same sink network element through a second Ethernet tunnel. The second Ethernet tunnel is a different path through the Ethernet packet-switched network from the first Ethernet tunnel. The first virtual circuit is switched from the first Ethernet tunnel to the second Ethernet tunnel. After the first virtual circuit is switched to the second Ethernet tunnel, packet traffic of the first virtual circuit and packet traffic of the second virtual circuit are transmitted over the second Ethernet tunnel.

In another aspect, the invention features an Ethernet packet-switched network, comprising a first network element and a second network element in communication with the first network element over a first Ethernet tunnel and a second Ethernet tunnel. The second Ethernet tunnel is a different path through the Ethernet packet-switched network from the first Ethernet tunnel. The first network element transmits packet traffic of a first virtual circuit to the second network element over the first Ethernet tunnel and packet traffic of a second virtual circuit to the second network element over the second Ethernet tunnel. The packet traffic of the first virtual circuit is associated with a different service instance from the packet traffic of the second virtual circuit. The network also includes a switch for switching the first virtual circuit from the first Ethernet tunnel to the second Ethernet tunnel, and a traffic manager merging packet traffic of the first virtual circuit with packet traffic of the second virtual circuit after the first virtual circuit is switched to the second Ethernet tunnel.

In still another aspect, the invention features a network element, comprising a first port interface transmitting packet traffic of a first virtual circuit over a first Ethernet tunnel to a sink network element and a second port interface transmitting packet traffic of a second virtual circuit over a second Ethernet tunnel to the sink network element. The second Ethernet tunnel is a different path through an Ethernet packet-switched network from the first Ethernet tunnel. The packet traffic of the first virtual circuit is associated with a different service instance from the packet traffic of the second virtual circuit. The network element includes a switch for switching the first virtual circuit from the first Ethernet tunnel to the second Ethernet tunnel, and a traffic manager merging packet traffic of the first virtual traffic with packet traffic of the second virtual circuit after the switch switches the first virtual circuit to the second Ethernet tunnel.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
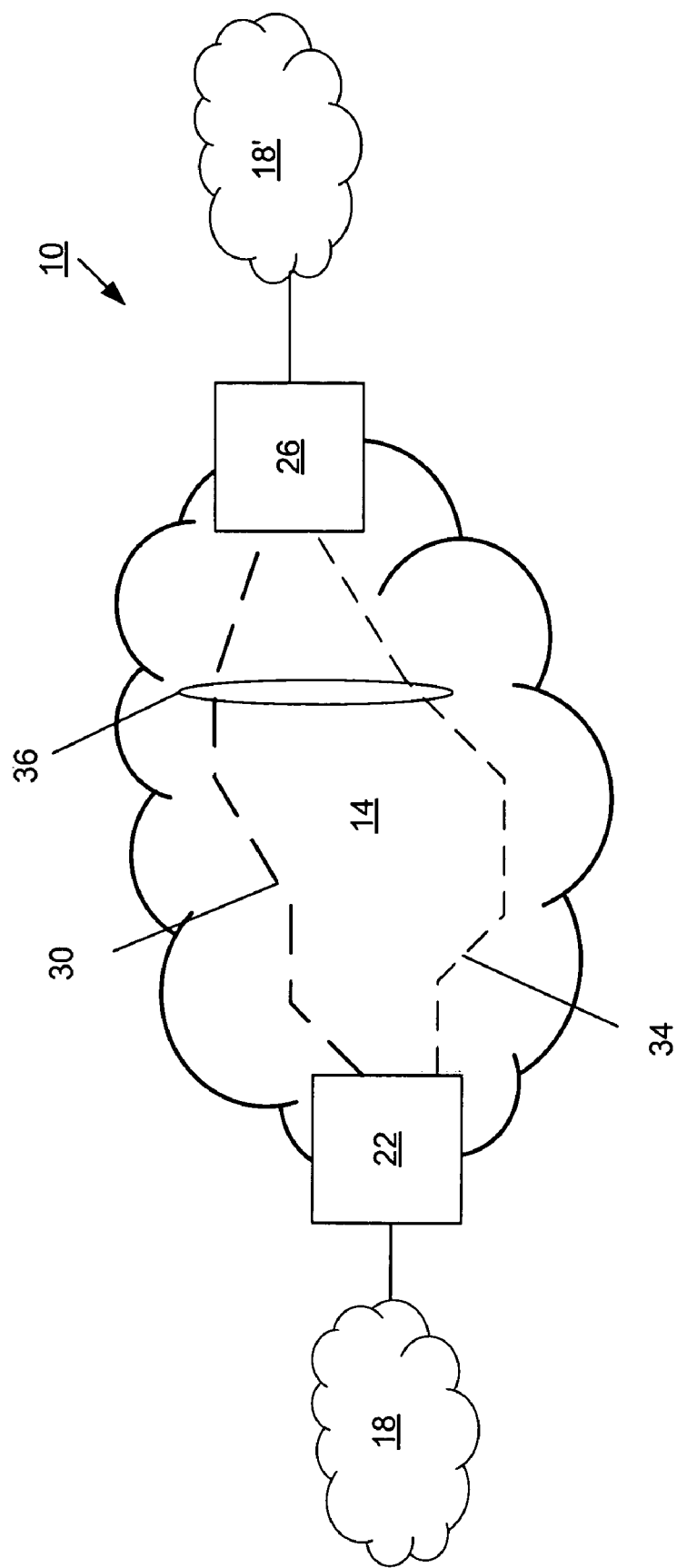
FIG. 1 is a diagram of an exemplary networking environment, including a service provider network, in which aspects of the invention may be implemented.

In general, embodiments of the present invention provide protection switching for Ethernet traffic over an Ethernet packet-switched network. This protection switching can achieve recovery from failure or fault within the network, e.g., within 50 milliseconds, more quickly than typical spanning tree algorithms. Implementations of the protection switching mechanism of the invention can occur in lieu of or in conjunction with a spanning tree algorithm.

By embodying the present invention in their networks, service providers are able to specify the availability of service (AoS), a component of quality of service (QoS), in their service level agreements (SLAs) with their customers. Availability of service describes a level of protection (or availability) associated with transporting the customer service flow within the network. As an example, a service provider (SP) can specify in its SLAs that its SP network can restore transport of a customer service within 50 ms of detecting a failure or fault within the SP network.

As a general overview, an Ethernet packet-switched network embodying the invention includes a source network element and a sink network element. These network elements are in communication with each other by a plurality of logical connections or paths (referred to herein as Ethernet tunnels). Protection switching occurs between (or among) Ethernet tunnels assigned to an Ethernet tunnel protection group (ETPG). An ETPG denotes the set of two or more Ethernet tunnels involved in protection switching, with every Ethernet tunnel within an ETPG starting at a common network element and ending at a common network element.

Within an ETPG, each Ethernet tunnel carries one or more virtual circuits. Each virtual circuit corresponds to an independent, distinct instance of a service (i.e., client traffic) transported by the SP network of a service provider. A protection switch occurs when a failure or service degrade is detected in one of the Ethernet tunnels within an ETPG (or when an administrator manually initiates the protection switch).

During the protection switch, each virtual circuit carried by the failing Ethernet tunnel switches to another operating Ethernet tunnel in the ETPG. The protection switching does not blindly preempt client traffic on that other Ethernet tunnel. Based on predefined criteria, the source network element statistically multiplexes client traffic of each switched virtual circuit with client traffic of each virtual circuit that the operating Ethernet tunnel was carrying before the protection switch. As a result, each switched virtual circuit shares the bandwidth of the operating Ethernet tunnel with each previously supported virtual circuit.

The predefined criteria, in general, ensure that at least a critical portion of each virtual circuit continues to traverse the SP network during the protection switch. To identify this critical portion, a service class and a bandwidth profile are associated with each virtual circuit. The bandwidth profiles specify various parameters that characterize the client traffic flows. Such parameters include a committed information rate (CIR), which corresponds to an agreed-to transmission rate. The CIR of a client traffic flow corresponds to the critical portion of the traffic flow.

Each bandwidth file also specifies an excess information rate (EIR) parameter, which corresponds to an information transmission rate in excess of the CIR (if bandwidth is available). During a protection switch, the source network element performs traffic management to utilize fully the bandwidth of the available operating Ethernet tunnel, ensuring bandwidth primarily for the critical portions of each traffic flow in the protection group, and then for the EIR and EBS (Excess Burst Size) of those traffic flows if bandwidth is available.

FIG. 1 shows an embodiment of a networking environment 10 in which aspects of the invention may be practiced. The networking environment 10 can have arbitrary size and complexity. In this embodiment, the networking environment 10 includes an SP (service provider) network 14 in communication with client networks 18, 18'. The SP network 14 is an Ethernet packet-switched network including a source network element (or node) 22 in communication with a sink network element 26 over at least two separate and distinct Ethernet tunnels 30, 34. Manual configuration (by an administrator) or a control plane can establish the Ethernet tunnels 30, 34 within the SP network 14. Each Ethernet tunnel 30, 34 can pass through one or more intermediate nodes (not shown) between the source and sink network elements 22, 26, although no intermediate node is common to the Ethernet tunnels 30, 34. Client traffic exits and enters the SP network 14 to and from the client networks 18, 18' through a respective one of the network elements 22, 26. Each Ethernet tunnel 30, 34 is considered a working path in that each carries client traffic of at least one virtual circuit (not shown).

In the embodiment shown, the Ethernet tunnels 30, 34 are part of an ETPG 36. Protecting switching may call upon either Ethernet tunnel 30, 34 in the ETPG 36 to protect the other, depending upon which Ethernet tunnel remains operating while the other is failing. Intermediate nodes do not need to participate in or be aware of such protection switching.

Figure 2:
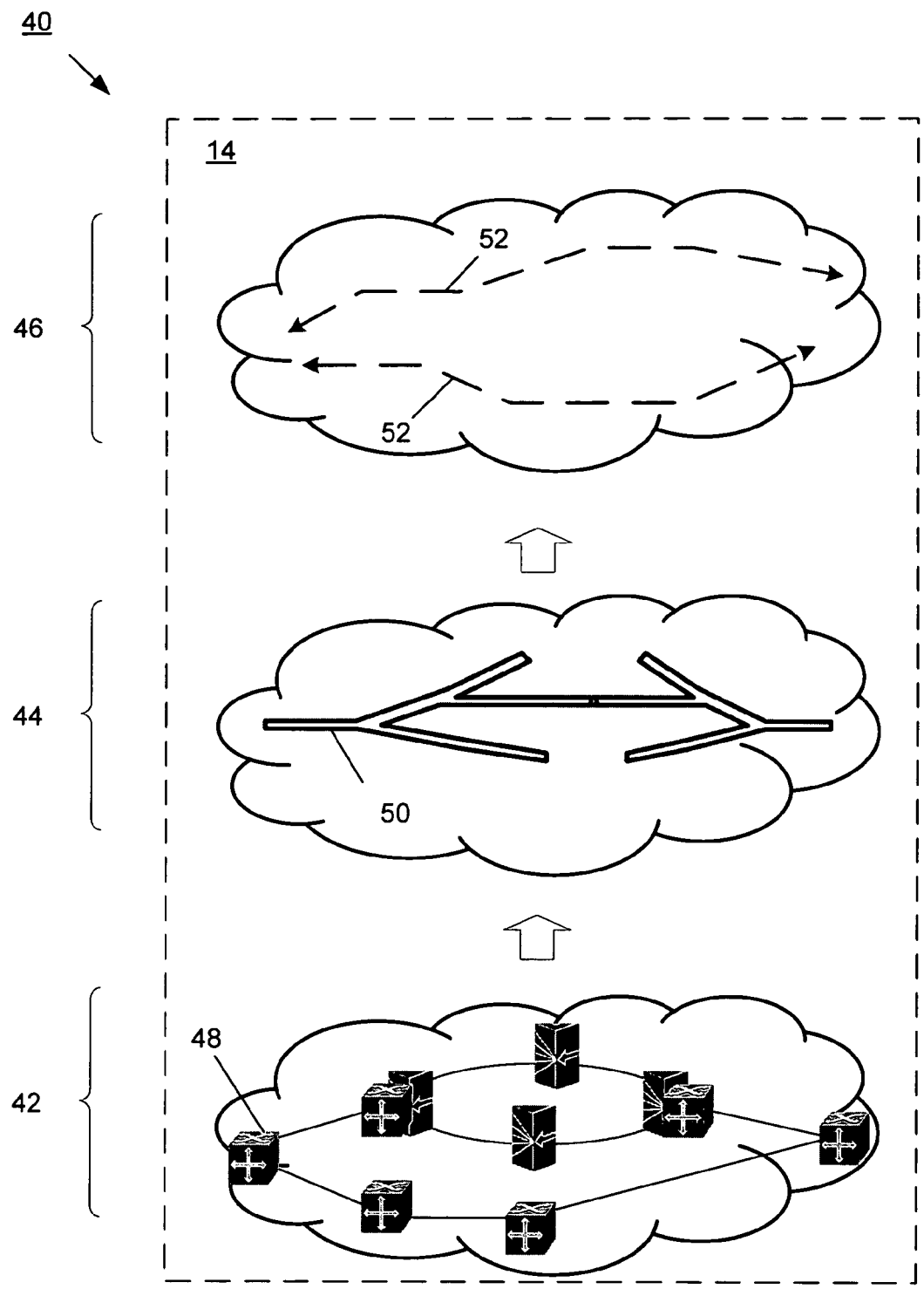
FIG. 2 is a diagram of an exemplary architectural layer representation of the service provider network of FIG. 1.

FIG. 2 shows an example of an architectural layer representation 40 of the SP network 14 of FIG. 1. The architectural layer representation 40 includes a physical resources layer 42, an Ethernet logical resources layer 44, and a service layer 46 of service resources and service instances. At the physical resources layer 42 are the physical resources of the service provider, such as equipment 48 (e.g., switches, multiplexers)

and facilities (e.g., channels, interfaces). Implementations of Ethernet-layer protection switching of the invention can overlay any physical topology capable of supporting an Ethernet packet switched network, e.g., Synchronous Optical Network (SONET).

The Ethernet logical resources layer 44, also called the Ethernet layer, includes Ethernet tunnels 50 (also called domains or zones), i.e., the logical instances of node connectivity within the SP network 14. Each Ethernet tunnel 50 represents a specific node layer 2 connectivity model. In effect, the Ethernet tunnels define a virtual LAN (or WAN) within the SP network 14, with each Ethernet tunnel being viewable as providing a broadcast containment domain for connecting multiple nodes within the SP network 14. Point-to-multipoint and point-to-point services can use this layer 2 connectivity for packet transport. Although the description of the invention focuses primarily on protection switching of point-to-point connections, the principles of the invention extend to supporting protection switching of point-to-multipoint connections.

The service resource layer 46 includes virtual circuits 52 of client flows being transported by the SP network 14. Virtual circuits 52 sharing a common node connectivity model can be associated with and served by the same Ethernet tunnel 50. Defects in a layer above the Ethernet layer 44 do not cause Ethernet tunnel protection switching. In addition, if protection mechanisms are being utilized at the physical layer 42 (e.g., Ethernet PHY or SONET/SDH) in conjunction with the protection-switching mechanism of the invention, then the physical layer 42 has an opportunity to restore traffic before the Ethernet layer 44 initiates protection switching.

The architecture 40 of the SP network achieves separation between the client networks 18, 18' and the SP network 14 on at least three bases: (1) address separation exists between a client's address space and a service provider's address space resulting in the provision of separate identification of service provider packet transport entities and virtual circuits; (2) client network control protocols do not control service provider network elements; and (3) Operations, Administrations, and Management (OAM) functions separately manage the virtual circuits and transport layers within the service provider's network.

Figure 3A:
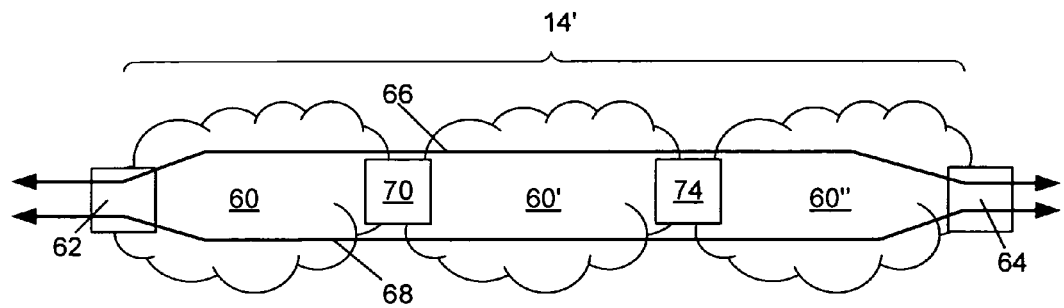
FIGS. 3A-3C are diagrams of exemplary protection domains across which protection switching of the invention may be performed.
Figure 3B:
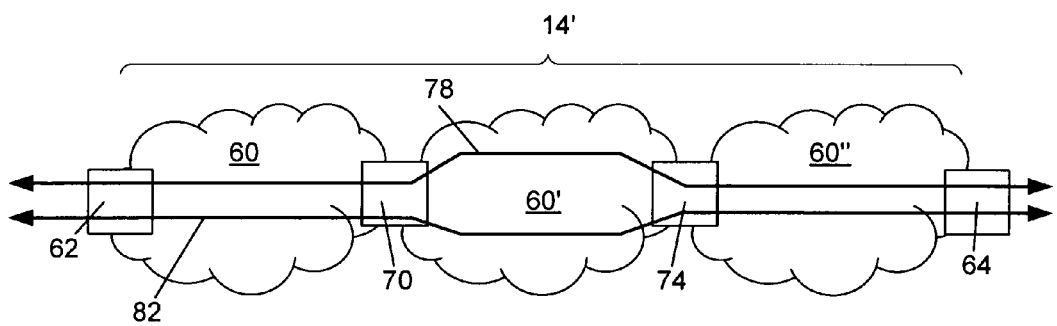
Figure 3C:
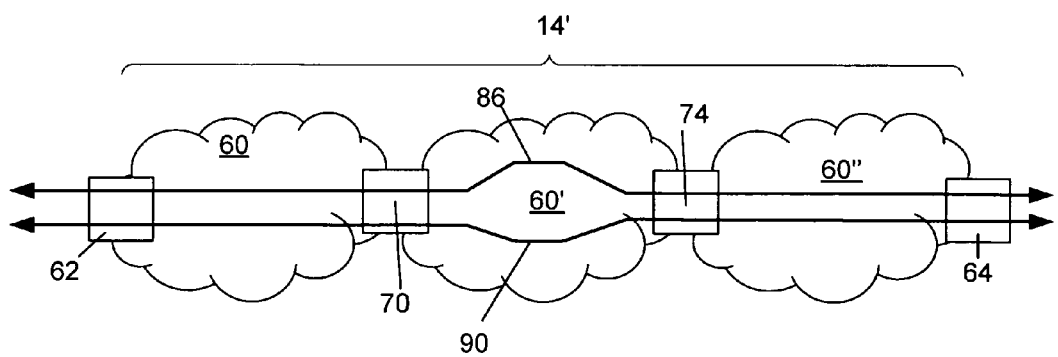

Protection switching at the Ethernet layer 44 protects client traffic across a protection domain. FIGS. 3A-3C illustrate three examples of protection domains. In each of these figures, an SP network 14' includes three sub-networks 60, 60', and 60". FIG. 3A illustrates a protection domain for a network connection that spans multiple sub-networks 60, 60', 60", extending from a source network element 62 to a sink network element 64. Separate Ethernet tunnels 66, 68 traverse the protection domain from the source network element 62 to the sink network element 64. To provide protection to client traffic in the protection domain, the Ethernet tunnels 66, 68 are part of an ETPG.

FIG. 3B shows another embodiment of a protection domain. In this embodiment, an ETPG comprised of Ethernet tunnels 78, 82 protects connections that extend from node 70 to node 74 across the sub-network 60'. FIG. 3C shows still another embodiment of a protection domain in the SP network 14'. Here, the protection domain includes a link in the sub-network 60', i.e., between two intermediate nodes (not shown) that is protected by an ETPG comprised of Ethernet tunnels 86, 90 that span this link.

The networking environment 10 can have a plurality of protection domains comprising any one or combination of the types exemplified by these figures. Protection domains are independent of each other, and protection switching in one protection domain does not affect network operations, performance, and protection switching in another protection domain.

Figure 4A:
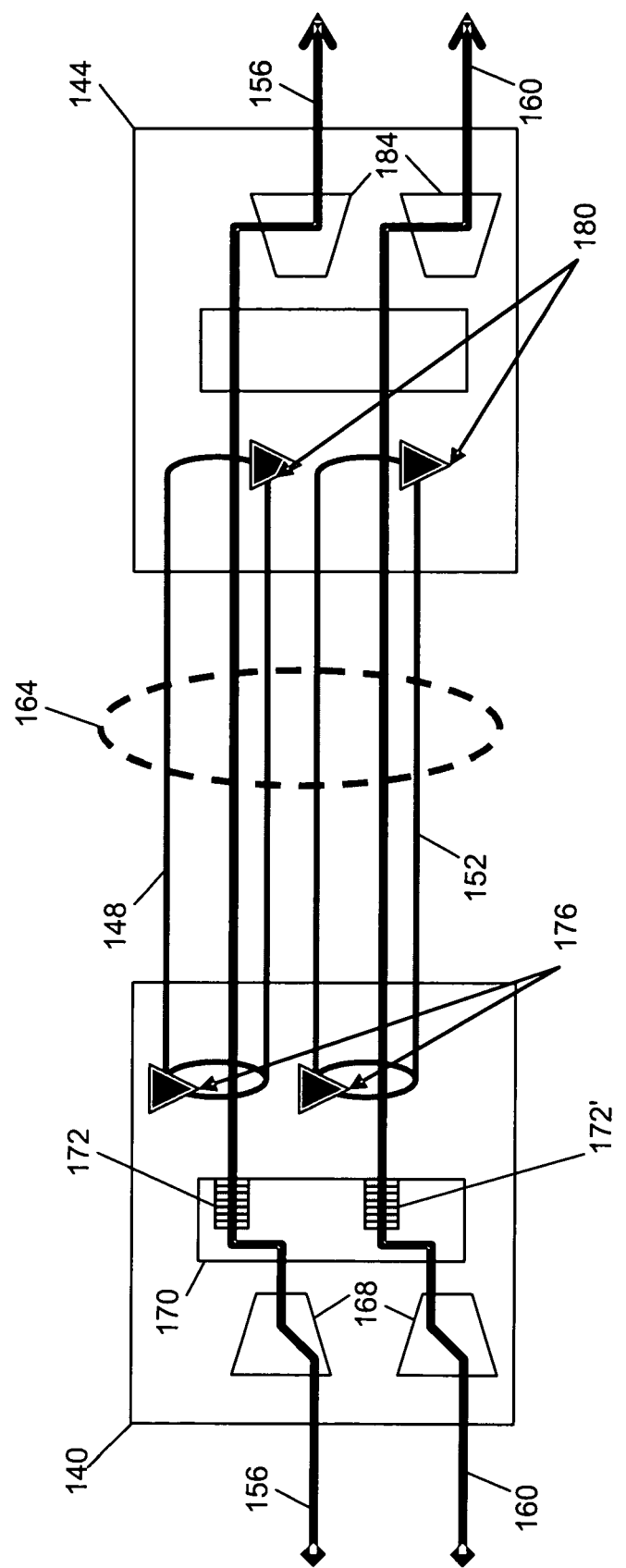
FIGS. 4A-4B are diagrams illustrating, by example, operation of a source network element and a sink network element before and after a protection switch between two Ethernet tunnels of an Ethernet tunnel protection group.
Figure 4B:
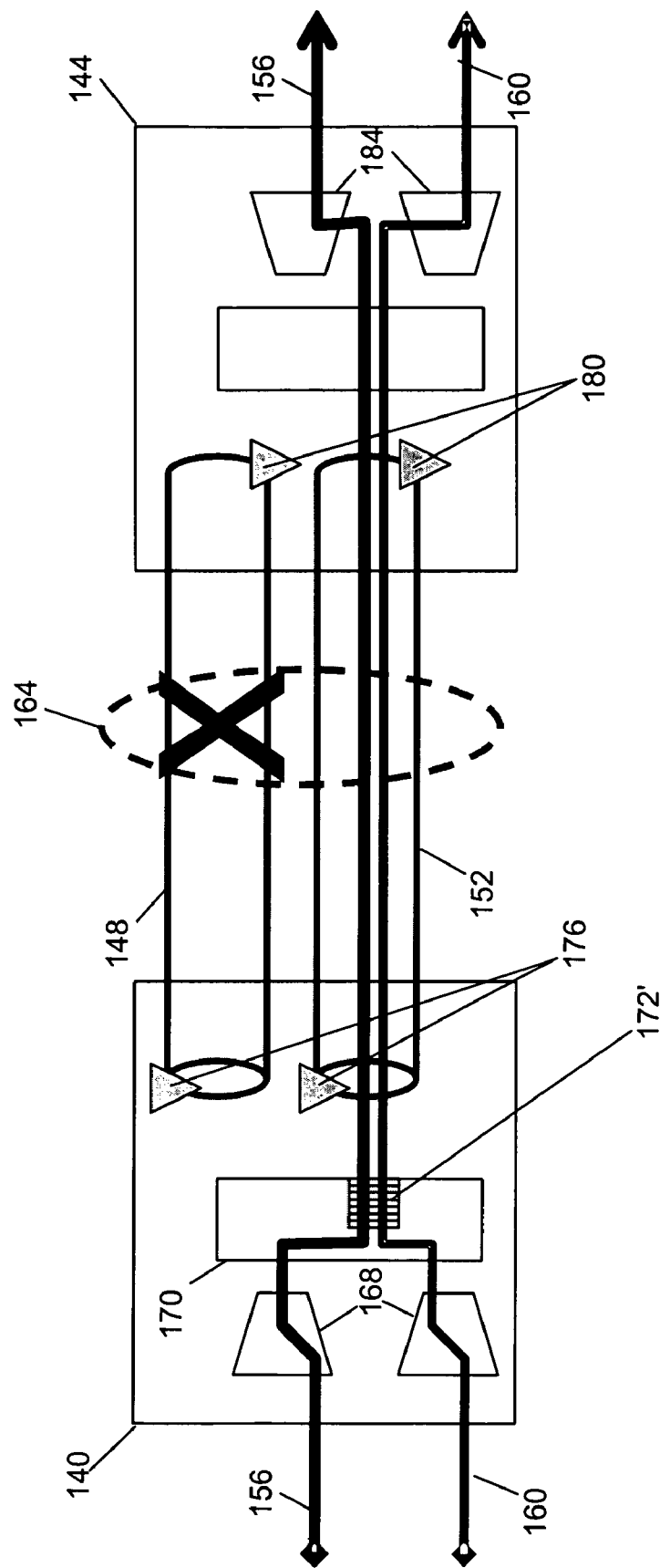

FIGS. 4A-4B illustrate exemplary operation of a source network element 140 and a sink network element 144 before and after a protection switch between two Ethernet tunnels 148, 152 assigned to Ethernet tunnel protection group 164. Each Ethernet tunnel 148, 152 carries client traffic associated with a virtual circuit 156, 160, respectively. The source network element 140 and sink network element 144 represent opposite ends of a protection domain.

The source network element 140 includes a plurality of selectors 168, an Ethernet switch 170 having a plurality of traffic managers 172, 172' (generally 172), and a plurality of port interfaces 176. Each port interface 176 is associated with one of the Ethernet tunnels 148, 152. Each selector 168 receives client traffic associated with one of the virtual circuits 156, 160 and selects an Ethernet tunnel towards which to forward the client traffic. The Ethernet switch 170 is in communication with the selectors 168 to receive the incoming client traffic therefrom and to forward the client traffic to one of the traffic managers 172, 172'. Each traffic manager 172, 172' is in communication with one of the port interfaces 176 to which that traffic manager 172 forwards conditioned (i.e., managed) client traffic for transmission over the associated Ethernet tunnel 148, 152. Each port interface 176 periodically inserts a continuity verification packet into the client traffic that the port interface 176 is sending over the Ethernet tunnel 148, 152. Continuity verification packets serve to detect defects in each Ethernet tunnel of an ETPG. Other types of continuity probe packets can be used in the practice of the invention.

The sink network element 144 includes a port interface 180 for each Ethernet tunnel 148, 152 and a plurality of selectors 184. Each selector 184 is a switch that selects which one of the Ethernet tunnels from which to receive packets. The port interfaces 180 detect and extract the continuity verification packets inserted into the client traffic by the source network element 140. If a defect exists in either Ethernet tunnel, the sink network element 114 detects and reports that defect to the source network element 140, which may then initiate a Ethernet tunnel protection switch.

FIG. 4B shows the Ethernet tunnel 148 of FIG. 4A to have failed (as denoted by the X drawn in the Ethernet tunnel 148). Because of the failure, the source network element 140 switches the virtual circuit 156 from the Ethernet tunnel 148 to the other Ethernet tunnel 152 of the ETPG 164. The traffic manager 172', which previously conditioned client traffic of the virtual circuit 160, operates after the protection switch to merge the client traffic of both virtual circuits 156, 160, as described below, for transmission over the SP network. Certain portions of client traffic of both virtual circuits 156, 160 traverse the protection domain over the operating Ethernet tunnel 152. The sink network element 144 receives the merged client traffic and may segregate such client traffic—according to the identity of its virtual circuit—for separate transmission over a network (e.g., over another sub-net of the SP network).

Figure 5A:
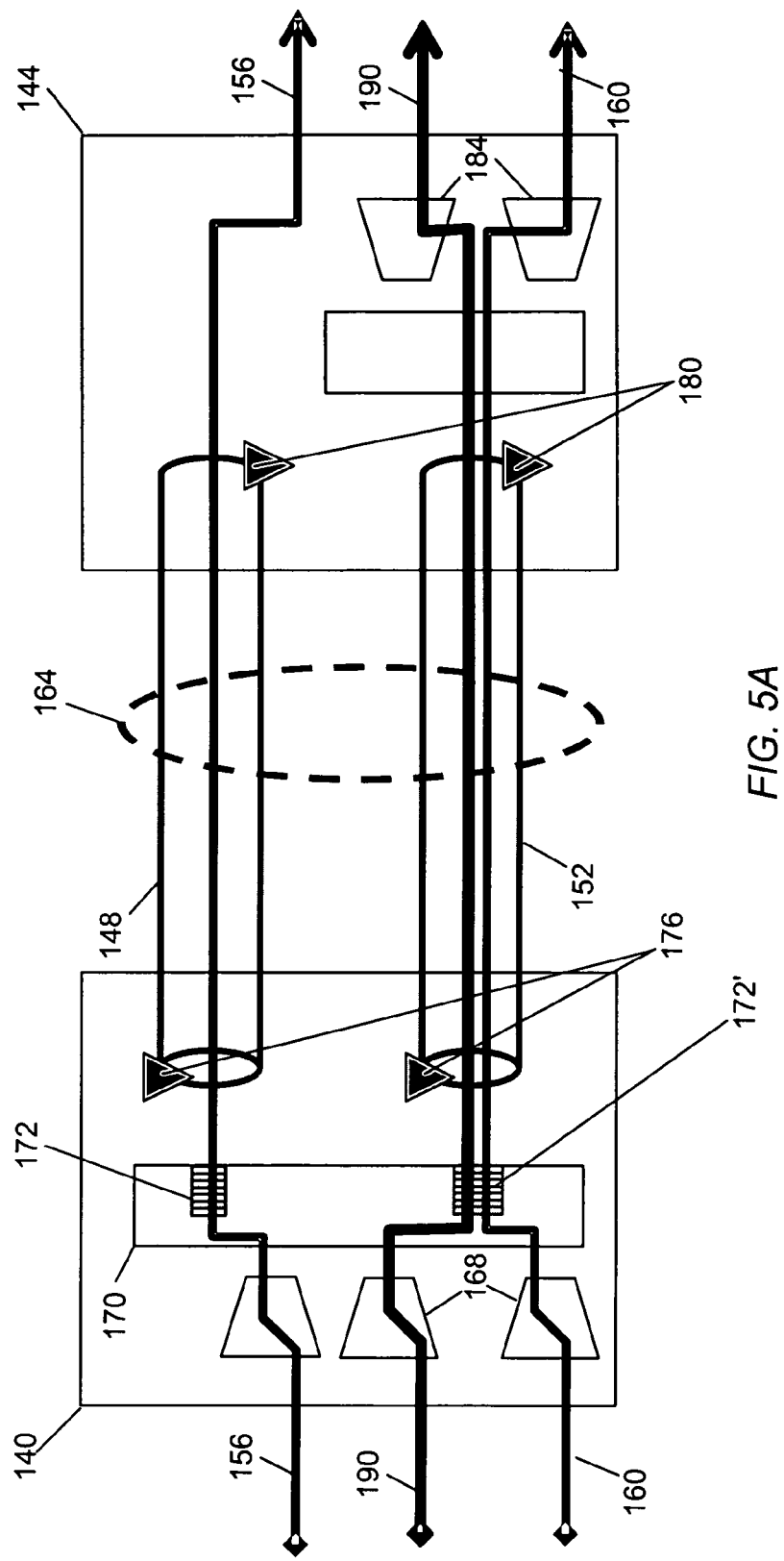
FIGS. 5A-5B are diagrams illustrating, by example, operation of a source network element and a sink network element before and after a protection switch between two Ethernet tunnels of an Ethernet tunnel protection group, in which a failing Ethernet tunnel supports multiple virtual circuits.
Figure 5B:
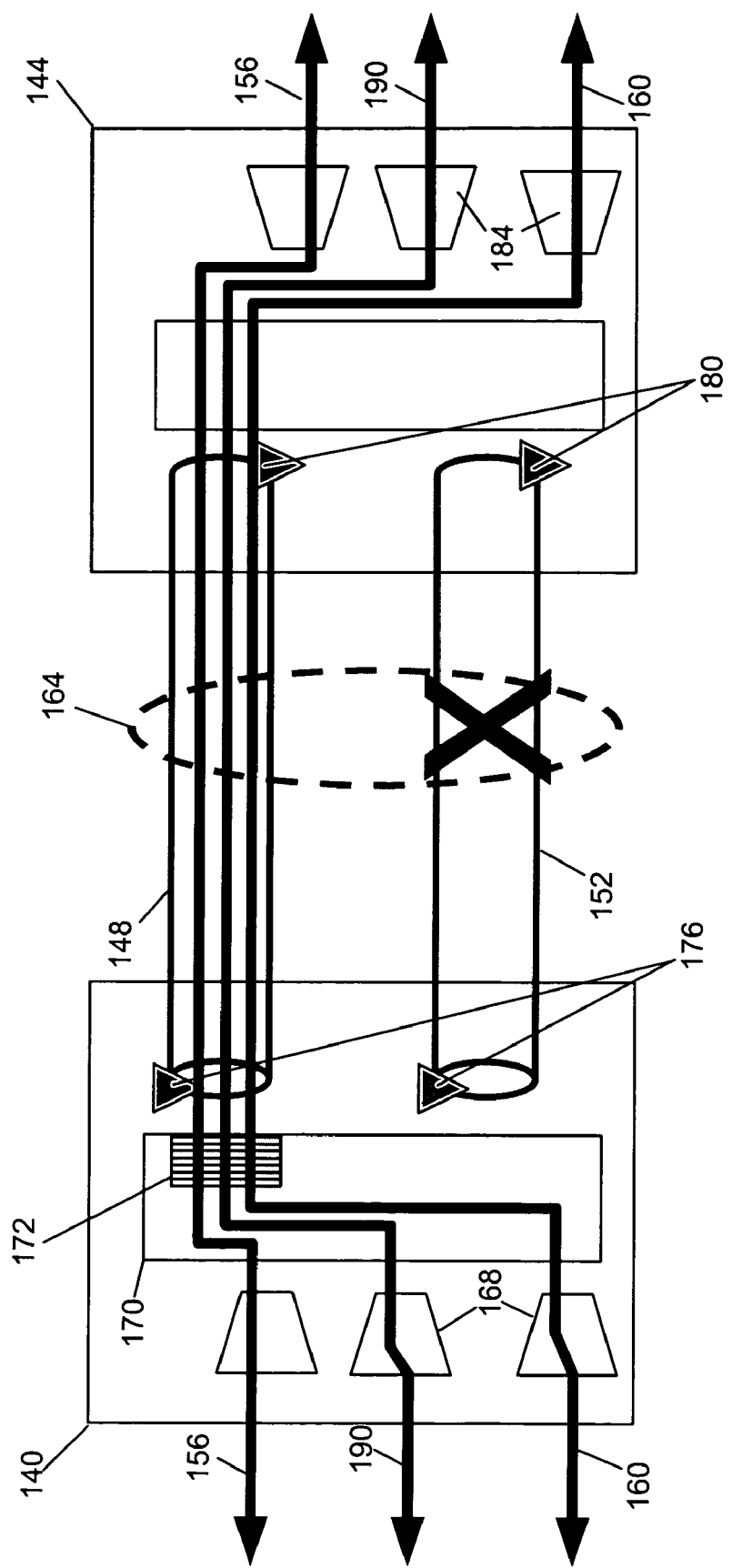

Whereas FIGS. 4A-4B illustrate, by example, protection switching involving an ETPG comprised of two Ethernet tunnels, with each Ethernet tunnel supporting one virtual circuit, the principles of the invention extend to ETPGs having more than two Ethernet tunnels and to Ethernet tunnels supporting more than one virtual circuit. FIGS. 5A-5B illustrate, for example, protection switching with an Ethernet tunnel that supports a plurality of virtual circuits. The example illustrated in FIGS. 5A-5B differs from that of FIGS.

4A-4B in that the Ethernet tunnel 152 in the ETPG 164 supports virtual circuits 190 in addition to virtual circuit 160. Also, in this example, the Ethernet tunnel 152 fails, affecting the client traffic of virtual circuits 160, 190. As shown in FIG. 5B, the Ethernet switch 170 switches both virtual circuits 160, 190 to the other Ethernet tunnel 148 in the ETPG 164. The traffic manager 172 merges the client traffic of all virtual circuits 156, 160, 190 for forwarding over the SP network through the operating Ethernet tunnel 148.

Figure 6A:
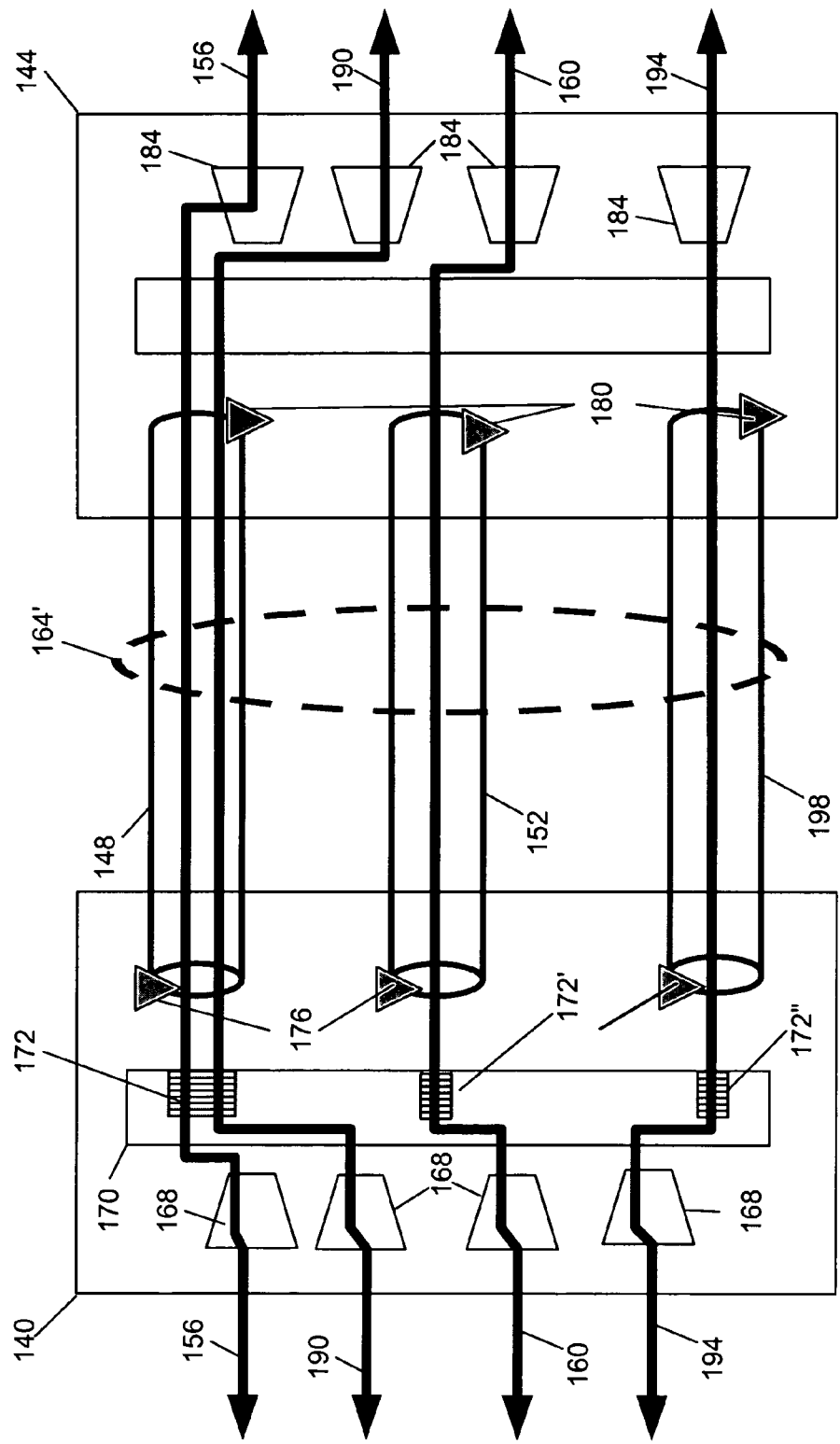
FIG. 6A is a diagram illustrating, by example, operation of a source network element and a sink network element before a protection switch among three Ethernet tunnels of an Ethernet tunnel protection group.
Figure 6B:
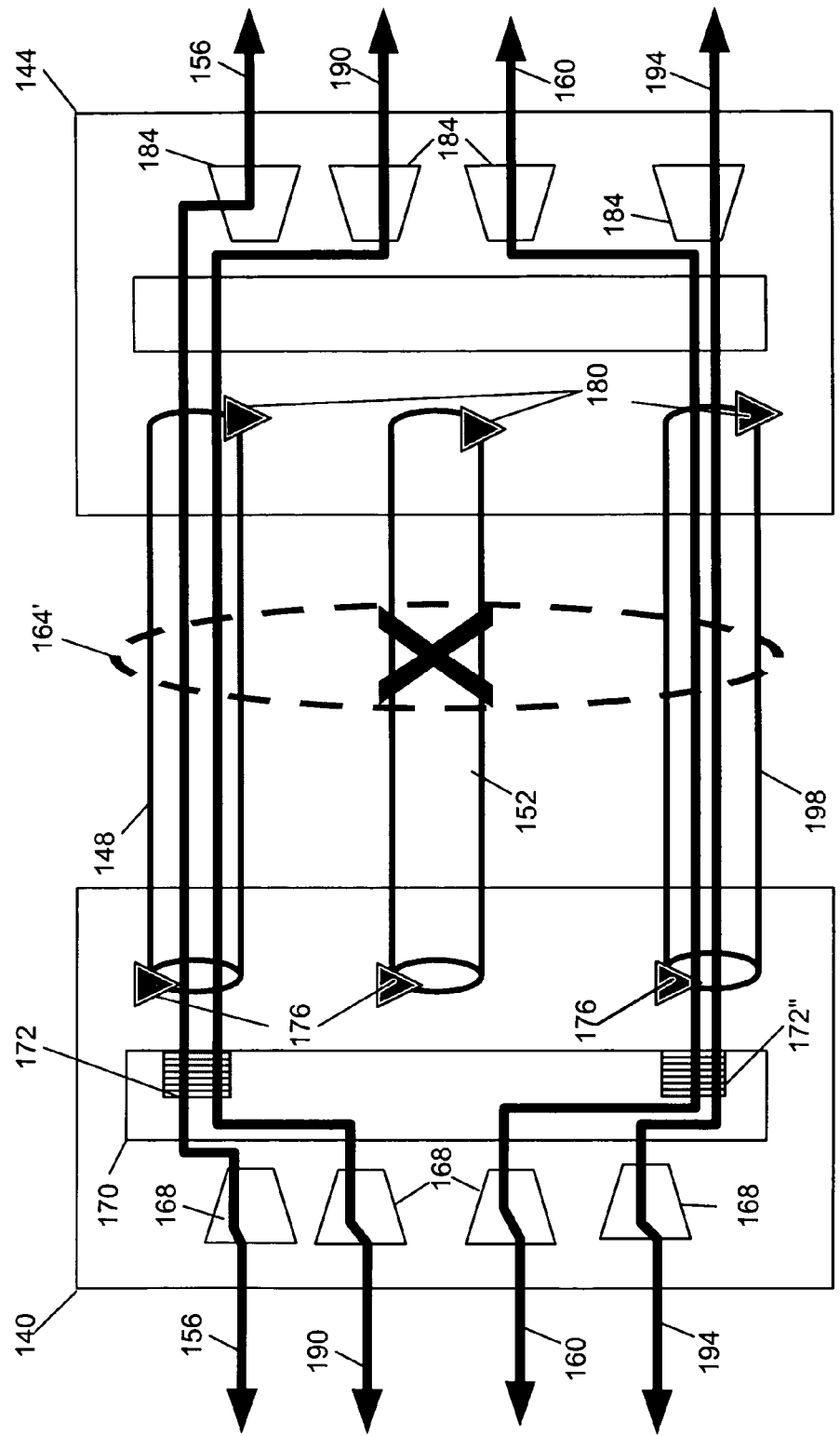
FIG. 6B is a diagram illustrating, by example, operation of the source network element and the sink network element of FIG. 6A after a protection switch is triggered by failure of one of the three Ethernet tunnels.
Figure 6C:
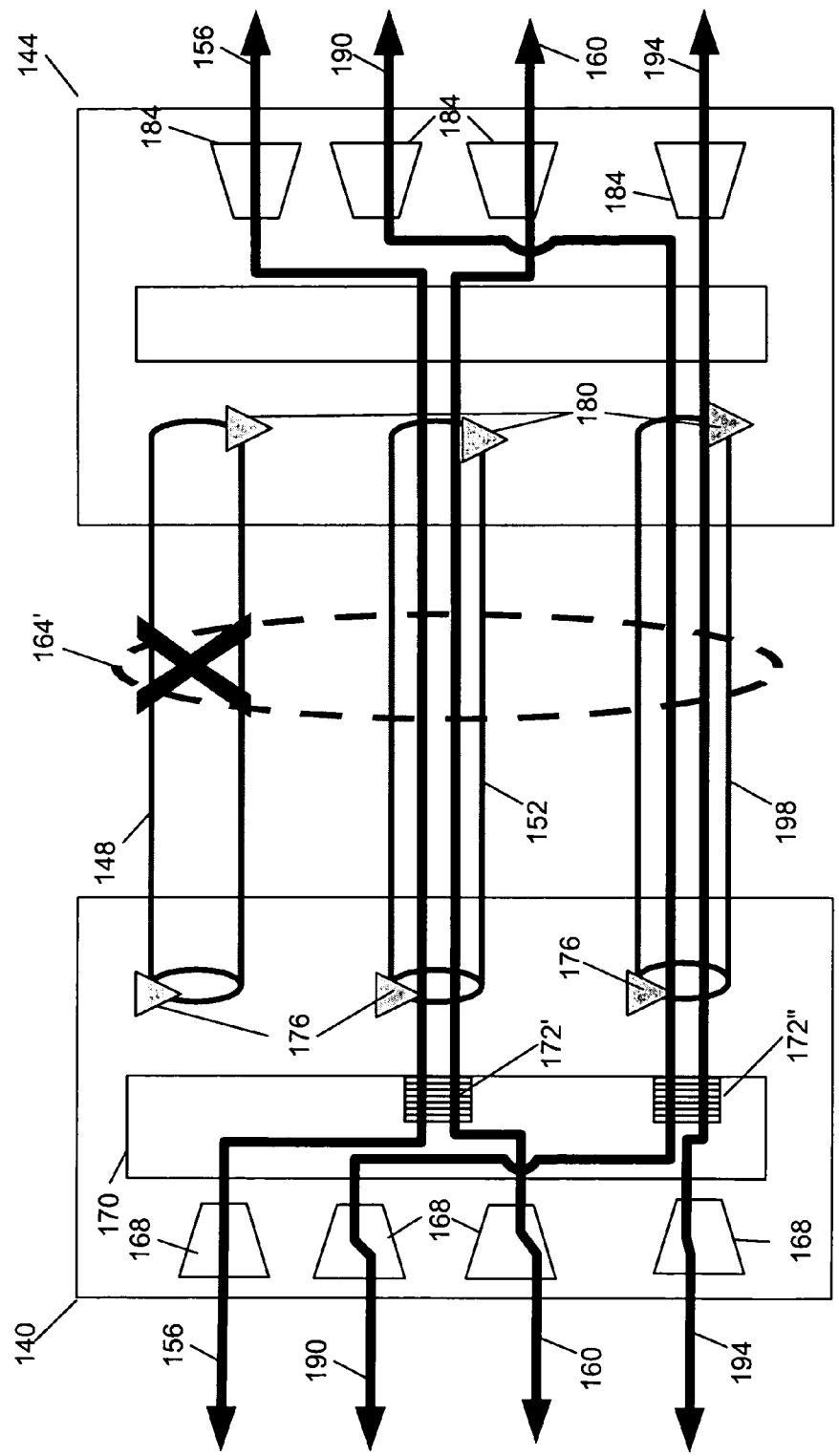
FIG. 6C is a diagram illustrating another example of operation of the source network element and the sink network element of FIG. 6A after a protection switch is triggered by failure of one of the three Ethernet tunnels.

FIGS. 6A-6C illustrate other examples of protection switching involving an ETPG 164' comprised of three Ethernet tunnels 148, 152, 198. FIG. 6A shows pre-protection switch operation. Client traffic of virtual circuits 156, 190 traverses Ethernet tunnel 148, client traffic of virtual circuit 160 traverses Ethernet tunnel 152, and client traffic of virtual circuit 194 traverses Ethernet tunnel 198.

FIG. 6B shows post-protection switch operation after Ethernet tunnel 152 fails. The source network element 140 can choose either of the other two operating Ethernet tunnels 148, 198 to support the virtual circuit 160 affected by the failing Ethernet tunnel 152. The determination as to which of the two operating Ethernet tunnels 148, 198 can be based on a variety of factors, e.g., a comparison of the availability of bandwidth on each of the operating Ethernet tunnels. In this example, the source network element 140 switches the virtual circuit 160 to the Ethernet tunnel 198, and the traffic manager 172" merges the client traffic of the virtual circuit 160 with that of virtual circuit 194.

FIG. 6C shows a different post-protection switch outcome if Ethernet tunnel 148 fails instead of Ethernet tunnel 152. In this example, the failure of the Ethernet tunnel 148 affects two virtual circuits 156, 190. The source network element 140 can switch the virtual circuits 156, 190 to the same or to different operating Ethernet tunnels. In this example, the source network element 140 switches virtual circuit 156 to Ethernet tunnel 152 and virtual circuit 190 to Ethernet tunnel 198. The traffic manager 172' merges the client traffic of virtual circuits 156, 160 for transmission over Ethernet tunnel 152, and the traffic manager 172" merges the client traffic of virtual circuits 190, 194 over Ethernet tunnel 198.

Conceivably, all but one of the Ethernet tunnels of an ETPG can fail, in which case the source network element would switch each affected virtual circuit to the remaining operating Ethernet tunnel. In general, provisioning of the virtual circuits ensures that the cumulative committed information rate of the virtual circuits associated with a given ETPG does not exceed the allocable bandwidth of any particular Ethernet tunnel within that ETPG. As a result, each Ethernet tunnel in the ETPG is certain to have sufficient bandwidth to support the aggregation of committed information rates configured for the virtual circuits of that ETPG. Notwithstanding, a service provider may oversubscribe an Ethernet tunnel—i.e., the cumulative committed information rates may exceed the allocable bandwidth of that Ethernet tunnel—without departing from the principles of the invention.

The traffic manager responsible for merging the client traffic of aggregated virtual circuits performs various traffic conditioning functions to manage potential congestion resulting from the protection switch. These traffic conditioning functions ensure transmission of the cumulative committed information associated with the aggregated virtual circuits. In addition, the traffic conditioning functions can operate to prevent excess information from entering the SP network.

The committed information and excess information associated with a given virtual circuit depends upon the service class and bandwidth profile associated with that virtual circuit. In general, a service class denotes the QoS of the client traffic being transported by the SP network. The particular service class associated with a client service can depend on three aspects: (1) availability of service, described above, (2) performance of service (PoS), and (3) type of service (ToS). Performance of service relates to various service characteristics associated with a particular client service flow within the SP network, e.g., priority, jitter, latency, and packet loss. Type of Service relates to the client signal type (i.e., format) being transported within the SP network. Table 1, below, provides an exemplary mapping of service classes to applications.

TABLE 1

| Traffic Category | Service Class | Target Application(s) |
|---|---|---|
| Class A | Critical | Super user, Telnet, and critical heartbeats between routers/switches. |
|  | Network | ICMP, OSPF, BGP, RIP, ISIS, COPS, RSVP, DNS, DHCP, BootP, high-priority OAM. |
|  | Premium | VoIP, T.38 Fax over IP, Modem over IP, Lawful Intercept, Low latency VPN with assured bandwidth. |
| Class B | Platinum | Video Conferencing, Interactive Gaming, low latency VPN with assured, burstable bandwidth. |
|  | Gold | Streaming audio, Video on demand and Pay per View Broadcast TV, Video surveillance, Webcasts, VPN with assured, burstable bandwidth. |
|  | Silver | Client/Server applications, SNA terminal to host transactions, Credit card transactions and wire transfers, ERP applications (e.g., SAP/BaaN), VPN with assured, burstable bandwidth |
|  | Bronze | Store and Forward applications, e.g., Email, Non-critical OAM&P (SNMP, TETP, Billing), VPN with assured, burstable bandwidth. |
| Class C | Standard | All other traffic not in any other class, best effort VPN (no bandwidth assurances). |

Each service class is associated with a bandwidth profile. A bandwidth profile specifies values for various parameters, including a CIR (Committed Information Rate) and an EIR (Excess Information Rate). Other parameters specified in a bandwidth profile can include a Committed Burst Size (CBS), Burst Duration (Tc), and Excess Burst Size (EBS).

The CIR represents a rate (in bytes per second) at which the service provider of the SP network agrees to transfer information over a virtual circuit. The EIR represents a sustainable rate of information transfer in excess of CIR that the SP network will deliver if there is available bandwidth. The EIR allows tagging of frames in the incoming stream of data on a virtual channel as being Discard Eligible (DE). In general, the combination of the CIR and EIR is less than or equal to the port or channel speed.

The CBS represents a maximum amount of data (bytes) that the service provider agrees to transfer under normal operating conditions over a certain measurement interval. The Tc represents the time over which rates and burst size measured. The relationship is CIR=CBS/Tc. The EBS represents a maximum amount of data (bytes) that the network may transfer if bandwidth is available.

Figure 7:
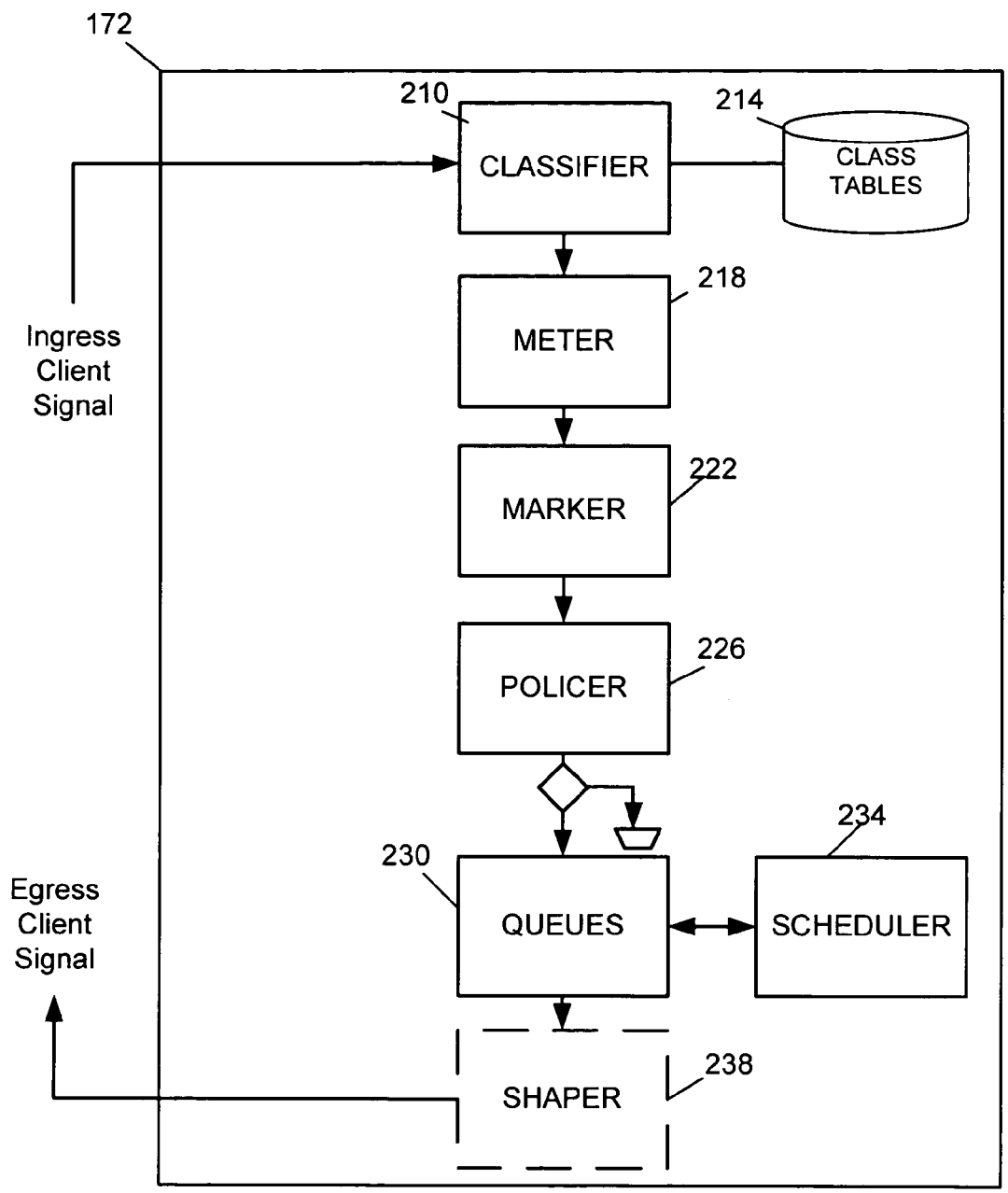
FIG. 7 is a block diagram of an embodiment of a traffic manager for merging client traffic of virtual circuits being carried by an Ethernet tunnel.

In general, a traffic manager executes traffic conditioning functions based on the bandwidth profile to multiplex statistically the client traffic of virtual circuits into an operating Ethernet tunnel. FIG. 7 shows an embodiment of a traffic manager 172. The traffic manager 172 includes a classifier 210 in communication with a class database 214, a meter 218, a marker 222, a policer 226, queues 230 in communication with a scheduler 234, and an optional shaper 238.

The classifier 210 associates a client virtual circuit with a service class and, thus, with a bandwidth profile. The meter 218 measures ingress client packets against the bandwidth profile associated with the service class. The marker 222 assigns colors of green, yellow, or red to client packets. Green indicates that the packet is in-profile, yellow indicates non-conforming out-of-profile, and red indicates grossly non-conforming out-of-profile. The policer 226 immediately discards red colored packets and forwards green and yellow packets to the queues 230. The queues 230, scheduler 234, and optional shaper 238 dispatch properly encapsulated client packets out of the Ethernet tunnel. The scheduler 234 governs the set of queues 230 and determines when a packet is transmitted from one of the queues. The scheduling influences the performance (e.g., delay, packet loss probability, delay variation) of the client flows within a particular queue. For example, transmitting packets from a high-priority class queue can be scheduled to occur with greater frequency than from a best-effort class queue.

For example, consider a virtual circuit associated with a service class A application (see table 1), the traffic manager 172 forwards client traffic of this virtual circuit to a queue 230 for transmission over the SP network if the traffic rate is less than or equal to the CIR for that virtual circuit. The marker 222 assigns the color green to these packets. Service class A traffic in excess of the CIR is discarded. For a virtual circuit associated with service class B, the traffic manager 172 forwards client traffic to a queue 230 if the traffic rate is less than or equal to the CIR for that virtual circuit. Packets of such in-profile client traffic are marked green. Packet traffic exceeding the CIR is considered excess traffic. Excess traffic less than or equal to the EIR is forwarded to the queues 230 for potential transmission. Such packets are marked yellow. Service class B traffic in excess of EIR is discarded. For service class C traffic, the traffic manager 172 forwards client traffic to a queue 230 if the traffic rate is than or equal to the EIR (i.e., marked yellow) and discards traffic in excess of EIR.

The traffic manager places green packets into a queue 230 to guarantee the committed information rates of the aggregate virtual circuits. Concerning the yellow packets, which represent the non-CIR component (i.e., EIR) of the virtual circuits, the traffic manager can use active queue management (AQM) to prune excess traffic statistically before placing the excess traffic onto the SP network.

Figure 8:
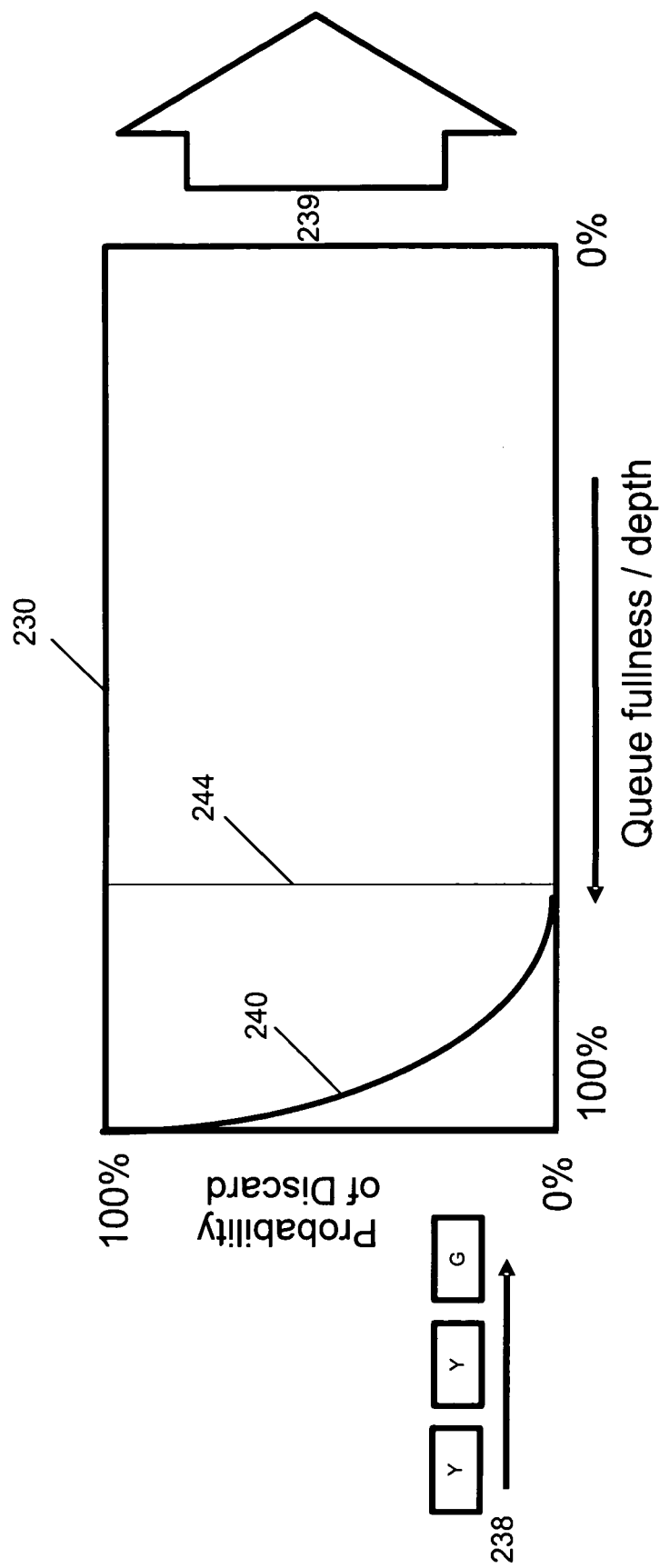
FIG. 8 is a diagram illustrating an embodiment of an active queue management mechanism used in multiplexing client traffic of virtual circuits aggregated for transmission over an operating Ethernet tunnel because of a protection switch.

FIG. 8 illustrates an embodiment of active queue management, a process by which the traffic manager drops yellow packets marked with different probabilities based on queue depth. As shown, green (G) and yellow (Y) packets enter a tail end 238 of a queue 230 and exit the queue head 239. Green packets usually enter the queue 230. Upon occasion, a green packet may not enter the queue, e.g., if the queue 230 is 100% full when the green packet arrives.

When a yellow packet reaches the queue 230, the traffic manager determines the current fullness of the queue 230. Depending upon its current fullness, the queue 230 determines whether to discard the yellow packet. The probability of discarding an arriving yellow packet increases along a probability-of-discard curve 240 that starts at approximately 0% when the fullness of the queue 230 is at the threshold 244 and increases to approximately 100% when the queue 230 is full.

The following illustrates two examples of active queue management. Consider, for example, that the fullness of the queue 230 exceeds the threshold 244 such that the probability of discard is 50%. When a yellow packet arrives, the traffic manager statistically determines whether to place the yellow packet into the queue 230. This statistical determination gives the yellow packet a 50% chance of being placed in the queue. If instead the fullness of the queue indicates that the probability of discard is 75%, then the statistical determination of the traffic manager gives the yellow packet a 25% chance of being placed in the queue.

Although described herein as a process for statistically pruning yellow packets, active management queue can also be used to prune packets of other colors (e.g., green). The process of AQM can use a different threshold and a different probability of discard curve for each color. In addition, AQM is just one example of the various mechanisms that the traffic manager can use to determine whether to discard a packet. In general, the decision to discard a packet can depend upon a combination of mechanisms, including, but not limited to, fullness of the queue, color of the packet, and priority of the packet.

Figure 9:
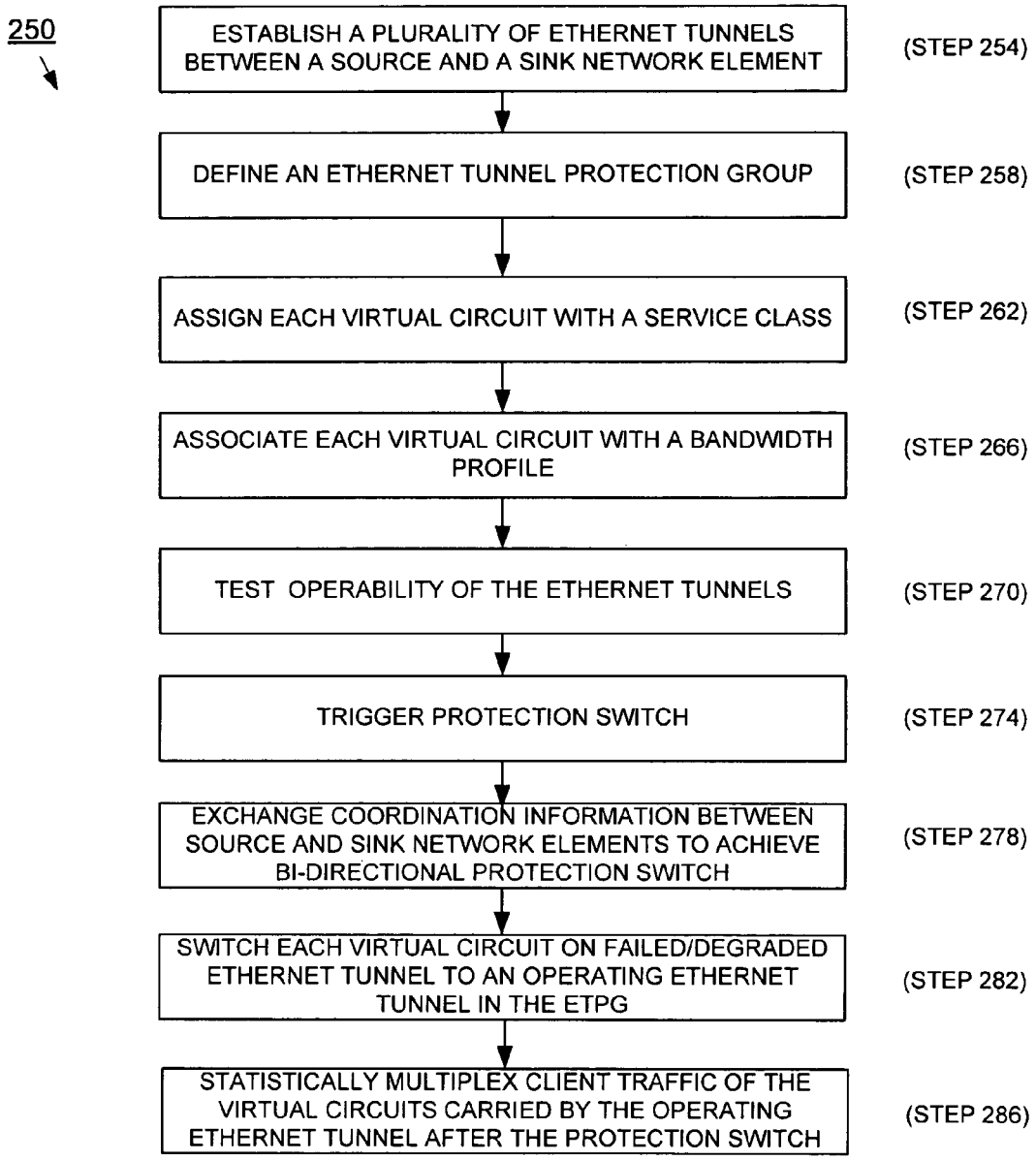
FIG. 9 is a flow diagram of an embodiment of a process for performing an Ethernet tunnel protection switch in an Ethernet packet-switched network.

FIG. 9 shows an embodiment of a process 250 for performing an Ethernet tunnel protection switch in an Ethernet packet-switched network. The order of steps is exemplary; it is to be understood that one or more of the steps may occur concurrently or in a different order than that shown.

At step 254, a plurality of Ethernet tunnels is established between a source network element and a sink network element. The Ethernet tunnels are associated (step 258) with an Ethernet tunnel protection group. At step 262, each virtual circuit is assigned a service class. Each service class—and consequently each virtual circuit—is associated (step 266) with a bandwidth profile.

At step 270, the operability of each Ethernet tunnel is tested by inserting a continuity verification packet, for example, into the client traffic being transmitted over that Ethernet tunnel. At step 274, a protection switch is triggered. A trigger of a protection switch can occur, for example, by operator control (e.g., manual switch, forced switched, etc.), one of the port interfaces determines that the Ethernet tunnel has failed or degraded, or a wait-to-restore timer expires (i.e., another layer, e.g. Ethernet PHY, has not been able to restore operation). Other mechanisms for triggering a protection switch can be employed.

At step 278, bidirectional protection switching is achieved through an exchange of coordination information between the source network element and sink network element. This coordination information can travel over an operating Ethernet tunnel in the ETPG. The source network element switches (step 282) each virtual circuit affected by the protection switch (e.g., each virtual circuit on the Ethernet tunnel that has failed or degraded) to an operating Ethernet tunnel in the ETPG. The traffic manager responsible for conditioning traffic associated with this operating Ethernet tunnel statistically multiplexes (step 286) the client traffic of the virtual circuits that are now carried by the operating Ethernet tunnel after the protection switch.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method of protection switching in an Ethernet packet-switched network, the method comprising:
   establishing first and second virtual circuits, the first virtual circuit carrying packet traffic associated with a different service instance from packet traffic carried by the second virtual circuit;
   transmitting packet traffic of the first virtual circuit from a source network element to a sink network element through a first Ethernet tunnel and packet traffic of the second virtual circuit from the same source network element to the same sink network element through a second Ethernet tunnel, the second Ethernet tunnel being a different path through the Ethernet packet-switched network from the first Ethernet tunnel;
switching the first virtual circuit from the first Ethernet tunnel to the second Ethernet tunnel; and
after switching the first virtual circuit to the second Ethernet tunnel, transmitting packet traffic of the first virtual circuit and packet traffic of the second virtual circuit through the second Ethernet tunnel.

2. The method of claim 1, further comprising statistically multiplexing packets of the packet traffic of the first virtual circuit with packets of the packet traffic of the second virtual circuit for transmission through the second Ethernet tunnel.

3. The method of claim 1, further comprising the steps of determining a committed information rate for each of the virtual circuits, and identifying packet traffic of each virtual circuit that conforms with the committed information rate for that virtual circuit;
and wherein the step of transmitting includes transmitting the conforming packet traffic of each virtual circuit through the second Ethernet tunnel.

4. The method of claim 1, further comprising the steps of:
establishing a third Ethernet tunnel between the source network element and sink network element; and
defining an Ethernet tunnel protection group that includes the first, second, and third Ethernet tunnels.

5. The method of claim 1, further comprising the steps of:
establishing a third virtual circuit;
transmitting packet traffic of the third virtual circuit from the source network element to the sink network element through the first Ethernet tunnel;
switching the third virtual circuit from the first Ethernet tunnel to the second Ethernet tunnel; and
after switching the third virtual circuit to the second Ethernet tunnel, transmitting packet traffic of the first, second, and third virtual circuits through the second Ethernet tunnel.

6. The method of claim 1, further comprising the steps of:
associating each virtual circuit with a bandwidth profile; and
selecting a portion of the packet traffic of each virtual circuit for transmission through the second Ethernet tunnel based on the bandwidth profile of that virtual circuit.

7. The method of claim 1, wherein the step of switching occurs upon detecting a signal fail or signal degraded on the first Ethernet tunnel.

8. The method of claim 1, wherein the step of switching occurs in response to an operator-initiated action.

9. The method of claim 1, further comprising the step of transmitting a continuity verification packet through each Ethernet tunnel to test for a defect in that Ethernet tunnel.

10. An Ethernet packet-switched network, comprising:
a first network element;
a second network element in communication with the first network element through a first Ethernet tunnel and a second Ethernet tunnel, the second Ethernet tunnel being a different path through the Ethernet packet-switched network from the first Ethernet tunnel, the first network element transmitting packet traffic of a first virtual circuit to the second network element through the first Ethernet tunnel and packet traffic of a second virtual circuit to the second network element through the second Ethernet tunnel, the packet traffic of the first virtual circuit being associated with a different service instance from the packet traffic of the second virtual circuit;
a switch for switching the first virtual circuit from the first Ethernet tunnel to the second Ethernet tunnel; and
a traffic manager merging packet traffic of the first virtual circuit with packet traffic of the second virtual circuit after the first virtual circuit is switched to the second Ethernet tunnel.

11. The Ethernet packet-switched network of claim 10, wherein the traffic manager statistically multiplexes packets of the packet traffic of the first virtual circuit with packets of the packet traffic of the second virtual circuit for transmission through the second Ethernet tunnel.

12. The Ethernet packet-switched network of claim 10, further comprising means for associating a committed information rate with each of the virtual circuits, and means for identifying packet traffic of each virtual circuit that conforms with the committed information rate for that virtual circuit; and wherein the source network element transmits the conforming packet traffic of each virtual circuit through the second Ethernet tunnel.

13. The Ethernet packet-switched network of claim 10, further comprising means for establishing a third Ethernet tunnel between the first network element and the second network element, and means for defining an Ethernet tunnel protection group that includes the first, second, and third Ethernet tunnels.

14. The Ethernet packet-switched network of claim 10, further comprising means for establishing a third virtual circuit, and wherein:
the first network element transmits packet traffic of the third virtual circuit to the second network element through the first Ethernet tunnel,
the switch switches the third virtual circuit from the first Ethernet tunnel to the second Ethernet tunnel when switching the first virtual circuit to the second Ethernet tunnel, and
the traffic manager multiplexes packet traffic of the first virtual circuit, second virtual circuit, and third virtual circuit for transmission through the second Ethernet tunnel after switching the first and third virtual circuits to the second Ethernet tunnel.

15. The Ethernet packet-switched network of claim 10, further comprising means for associating each virtual circuit with a bandwidth profile, and wherein the traffic manager selects a portion of the packet traffic of each virtual circuit for transmission through the second Ethernet tunnel based on the bandwidth profile of that virtual circuit.

16. The Ethernet packet-switched network of claim 10, further comprising means for testing for a defect in each Ethernet tunnel.

17. A network element, comprising:
a first port interface transmitting packet traffic of a first virtual circuit through a first Ethernet tunnel to a sink network element;
a second port interface transmitting packet traffic of a second virtual circuit through a second Ethernet tunnel to the sink network element, the second Ethernet tunnel being a different path through an Ethernet packet-switched network from the first Ethernet tunnel, the packet traffic of the first virtual circuit being associated with a different service instance from the packet traffic of the second virtual circuit;
a switch for switching the first virtual circuit from the first Ethernet tunnel to the second Ethernet tunnel; and
a traffic manager merging packet traffic of the first virtual traffic with packet traffic of the second virtual circuit after the switch switches the first virtual circuit to the second Ethernet tunnel.

18. The network element of claim 17, wherein the traffic manager statistically multiplexes packets of the packet traffic of the first virtual circuit with packets of the packet traffic of the second virtual circuit for transmission through the second Ethernet tunnel.

19. The network element of claim 17, wherein the traffic manager further comprises means for associating a committed information rate with each of the virtual circuits, and means for identifying packet traffic of each virtual circuit that conforms with the committed information rate for that virtual circuit; and wherein the second port interface transmits the conforming packet traffic of each virtual circuit through the second Ethernet tunnel.

20. The network element of claim 17, further comprising means for testing for a defect in each Ethernet tunnel.

* * * * *